United States Patent
Lee et al.

(10) Patent No.: US 8,328,886 B2
(45) Date of Patent: Dec. 11, 2012

(54) FUEL PROCESSOR HAVING TEMPERATURE CONTROL FUNCTION FOR CO SHIFT REACTOR AND METHOD OF OPERATING THE FUEL PROCESSOR

(75) Inventors: Kang-hee Lee, Yongin-si (KR); Soon-ho Kim, Yongin-si (KR); Doo-hwan Lee, Yongin-si (KR); Hyun-chul Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 625 days.

(21) Appl. No.: 11/835,563

(22) Filed: Aug. 8, 2007

(65) Prior Publication Data

US 2008/0311446 A1 Dec. 18, 2008

(30) Foreign Application Priority Data

Nov. 13, 2006 (KR) ........................ 10-2006-0111892

(51) Int. Cl.
*B01J 8/00* (2006.01)
(52) U.S. Cl. ...................................... 48/127.9; 422/626
(58) Field of Classification Search ........... 48/61–118.5, 48/127.9; 429/129–242
See application file for complete search history.

(56) References Cited

U.S. PATENT DOCUMENTS

| 5,110,559 A * | 5/1992 | Kondo et al. ................. 422/109 |
| 2003/0093950 A1* | 5/2003 | Goebel et al. ............... 48/197 R |
| 2006/0067863 A1* | 3/2006 | Wheat et al. .................. 422/198 |

* cited by examiner

*Primary Examiner* — Imran Akram
(74) *Attorney, Agent, or Firm* — Christie, Parker & Hale, LLP

(57) ABSTRACT

A fuel processor includes a reformer that generates hydrogen gas by reacting a fuel source and water; a burner that heats the reformer to a temperature suitable for a hydrogen generation reaction; a CO shift reactor that removes CO generated during the hydrogen generation reaction in the reformer; a heating element for heating the CO shift reactor; and a cooling element for cooling the CO shift reactor, wherein the cooling element comprises at least one of a cooling water flow line for heat exchange with the CO shift reactor when cooling water flows through the cooling water flow line and a cooling gas flow line for heat exchange with the CO shift reactor when a cooling gas, which is a burner exhaust gas that has heat exchanged with cooling water, flows through the cooling gas flow line. When the fuel processor is operated, a stable CO removal performance can be maintained since the temperature of the CO shift reactor can be actively controlled.

6 Claims, 4 Drawing Sheets

FUEL PROCESSOR HAVING TEMPERATURE CONTROL FUNCTION FOR CO SHIFT REACTOR AND METHOD OF OPERATING THE FUEL PROCESSOR

CROSS-REFERENCE TO RELATED APPLICATION

This application claims the benefit of Korean Application No. 2006-111892, filed Nov. 13, 2006, in the Korean Intellectual Property Office, the disclosure of which is incorporated herein by reference.

BACKGROUND OF THE INVENTION

1. Field of the Invention

Aspects of the present invention relates to a fuel processor that reforms a fuel suitable for using in a fuel cell system. More particularly, aspects of the present invention relate to a fuel processor having a temperature control function for a CO shift reactor, and a method of operating the fuel processor.

2. Description of the Related Art

A fuel cell is an electricity generator that changes the chemical energy of a fuel into electrical energy through a chemical reaction. The fuel cell can continuously generate electricity as long as the fuel is supplied. FIG. 1 is a schematic drawing illustrating the energy transformation structure of a conventional fuel cell. Referring to FIG. 1, when air that includes oxygen is supplied to a cathode 1 and a fuel containing hydrogen is supplied to an anode 3, electricity is generated by a reverse reaction of water electrolysis through an electrolyte membrane 2. However, the electricity generated by a unit cell typically does not have a high voltage to be useful. Therefore, electricity is typically generated by a stack in which a plurality of unit cells is connected in series.

A hydrocarbon group material such as a natural gas may be used as a fuel source for supplying hydrogen to the fuel cell stack. Hydrogen may be produced from the fuel source in a conventional fuel processor 10, as depicted in FIG. 2, in order to supply the hydrogen to a stack 20.

The fuel processor 10 includes a desulfurizer 11, a reformer 12, a burner 13, a water supply pump 16, first and second heat exchangers 14a and 14b, and a CO removal unit 15 consisting of a CO shift reactor 15a and a CO remover 15b. The hydrogen extraction process is performed in the reformer 12. That is, hydrogen is generated through a chemical reaction 1, indicated below, between a hydrocarbon group gas, which is the fuel source entering from a fuel tank 17, and steam entering from a water tank 18 under the action of a water supply pump 16 in the reformer 12 that is heated by the burner 13.

$$CH_4 + 2H_2O \rightarrow CO_2 + 4H_2 \quad \text{[Chemical reaction 1]}$$

However, at this time, CO is generated together with $CO_2$ as a byproduct. If a fuel containing 10 ppm or more CO is supplied to the stack 20, electrodes are poisoned, resulting in a rapid reduction of the performance of the fuel cell. Therefore, the content of CO in an outlet of the reformer 12 is controlled to be 10 ppm or less by installing the CO shift reactor 15a and the CO remover 15b.

A chemical reaction 2, indicated below, occurs in the CO shift reactor 15a and chemical reactions 3, 4, and 5 as indicated below occur in the CO remover 15b. The CO content in the fuel that has passed through the CO shift reactor 15a is 5,000 ppm or less and the CO content in the fuel that has passed through the CO remover 15b is reduced to 10 ppm or less.

$$CO + H_2O \rightarrow CO_2 + H_2 \quad \text{[Chemical reaction 2]}$$

$$CO + \tfrac{1}{2}O_2 \rightarrow CO_2 \quad \text{[Chemical reaction 3]}$$

$$H_2 + \tfrac{1}{2}O_2 \rightarrow H_2O \quad \text{[Chemical reaction 4]}$$

$$CO + 3H_2 \rightarrow CH_4 + H_2O \quad \text{[Chemical reaction 5]}$$

The desulfurizer 11 located at an inlet of the reformer 12 removes sulfur components contained in the fuel source. The sulfur components are absorbed while passing through the desulfurizer 11. Desulfurization of the fuel is important because sulfur components can easily poison the electrodes of the stack 20 even if sulfur components are present in a concentration as low as 10 parts per billion (ppb).

When the fuel processor 10 is operating, a fuel source such as a natural gas is supplied to the reformer 12 through the desulfurizer 11 from the fuel tank 17. A portion of the fuel source is used as a fuel for igniting the burner 13. Then, steam that has entered through the first and second heat exchangers 14a and 14b reacts with the desulfurized fuel source in the reformer 12 and thus, hydrogen is generated. Then, the hydrogen is supplied to the stack 20 after passing through the CO shift reactor 15a and the CO remover unit 15 at which point the CO content is 10 ppm or less.

Meanwhile, in order to operate stably, the temperature in the reformer 12 and the CO shift reactor 15a of the fuel processor 10 must be maintained at a suitable level. Generally, the normal operating temperature of the reformer 12 is approximately 700° C. and that of the CO shift reactor 15a is approximately 200° C. The temperature of the reformer 12 can be readily controlled to a desired level since the reformer 12 is directly heated by the burner 13. However, the CO shift reactor 15a is heated by conduction heat from the reformer 12 and by gases entering from the reformer 12. Therefore, the temperature of the CO shift reactor 15a cannot be easily controlled. However, it is known that, when the temperature of the CO shift reactor 15a exceeds an appropriate level, CO is not sufficiently removed. If the temperature of the CO shift reactor 15a is not readily controlled, there is a high possibility that the stack 20 may be damaged by CO. According to an experiment, when the temperature inside the CO shift reactor 15a is maintained in a temperature range of 200 to 300° C., the CO shift reactor 15a can maintain an optimum condition for reducing the CO content in the reformer gasses to 5000 ppm or less. If the temperature inside the CO shift reactor 15a is not in the temperature range, CO cannot properly react with steam in the CO shift reactor 15a. That is, CO cannot be properly removed. Accordingly, even if the reformer gas passes through the CO remover unit 15b, it is difficult to maintain the CO content at a level of 10 ppm or less, which is the target CO content level, in the reformer gas that is supplied to the stack 20.

A fuel processor having a structure in which the reformer 12 and the CO shift reactor 15a contact each other via a thermal insulation material disposed therebetween has been recently employed. In this structure, the CO shift reactor 15a is heated by heat transmitted through the thermal insulation material from the reformer 12. Therefore, there is a high possibility that the temperature of the CO shift reactor 15a may exceed the appropriate temperature range when the temperature of the reformer 12 exceeds its appropriate temperature. When the temperature of the CO shift reactor 15a becomes too high, it is necessary to reduce the temperature of the CO shift reactor 15a to its appropriate level. However, the fuel processor 10 does not have a cooling function. Therefore, in case of a heavy load, the fuel processor 10 cannot operate stably.

Also, when the fuel processor 10 starts operating, it is necessary to rapidly increase the temperature of the CO shift reactor 15a. That is, as described above, it takes time for the reformer 12 and the CO shift reactor 15a to reach their appropriate operating temperatures. In particular, it takes time for the CO shift reactor 15a, which is indirectly heated by gases entering from the reformer 12, to reach a normal operating temperature, as compared to the reformer 12, which is directly heating with the burner 13. According to measurements, it takes only 20 minutes, approximately, for the reformer 12 to reach its normal operating temperature of 700° C. after starting to operate, but it takes approximately one hour for the CO shift reactor 15a to reach 200° C.

Accordingly, although the reformer 12 rapidly reaches its normal operating temperature, the fuel processor 10 is unable to operate until the CO shift reactor 15a reaches its normal operating temperature. In other words, a hydrogen gas can be produced in the reformer 12 in approximately 20 minutes after the fuel processor 10 starts operating, but in order to reduce the CO content in the gas below 5,000 ppm, the fuel processor 10 must wait for one hour to be operated.

Accordingly, for a smooth operation of the fuel processor 10, there is a need for a system that can actively increase and decrease the temperature of the CO shift reactor 15a as necessary.

SUMMARY OF THE INVENTION

Aspects of the present invention provide a fuel processor having an active temperature control function for a CO shift reactor and a method of operating the fuel processor.

According to an aspect of the present invention, there is provided a fuel processor comprising: a reformer that generates hydrogen gas by reacting a fuel source and water; a burner that heats the reformer to a temperature suitable for a hydrogen generation reaction; a CO shift reactor that removes CO generated during the hydrogen generation reaction in the reformer; a heating element for heating the CO shift reactor; and a cooling element to cool the CO shift reactor, wherein the cooling element comprises at least one of a cooling water flow line for heat exchange with the CO shift reactor when cooling water flows through the cooling water flow line and a cooling gas flow line for heat exchange with the CO shift reactor when a cooling gas, which is a burner exhaust gas that has heat exchanged with cooling water, flows through the cooling gas flow line.

According to an aspect of the present invention, the heating element may comprise an exhaust gas flow line for heat exchange with the CO shift reactor when a burner exhaust gas flows through the exhaust gas flow line.

According to an aspect of the present invention, there is provided a fuel processor comprising a reformer that is supplied with a fuel source and reaction water that react to generate hydrogen gas; a burner that provides heat to the reformer and that produces a burner exhaust gas; a CO shift reactor that removes CO from the generated hydrogen gas; and a heat exchange flow line that is selectively supplied with cooling water or cooling gas to cool the CO shift reactor or with a heating gas to heat the CO shift reactor.

According to an aspect of the present invention, there is provided a method of operating a fuel processor in which hydrogen gas is produced in a reformer heated by a burner to supply it to a stack through a hydrogen gas generation reaction between water and a fuel source, and a CO component produced during the hydrogen generation reaction is removed in a CO shift reactor, the method comprising: heating the CO shift reactor through heat exchange with a burner exhaust gas when the temperature inside the CO shift reactor is needed to be increased; and cooling the CO shift reactor through heat exchange with one of water and cooling gas obtained by heat exchange the burner exhaust gas with cooling water when the temperature reduction inside the CO shift reactor is needed to be reduced.

According to an aspect of the present invention, the temperature of the cooling gas may be 100° C. or less.

According to an aspect of the present invention, there is provided a method of operating a fuel processor, the fuel processor comprising a reformer that is supplied with a fuel source and reaction water that react to generate hydrogen gas; a burner that provides heat to the reformer and that produces a burner exhaust gas; a CO shift reactor that removes CO from the generated hydrogen gas; and a heat exchange flow line that is selectively supplied with cooling water or cooling gas to cool the CO shift reactor or with a heating gas to heat the CO shift reactor, the method comprising supplying the heat exchange flow line with heating gas when a temperature inside the CO shift reactor is below a first predetermined temperature; supplying the heat exchange flow line with cooling gas when a temperature inside the CO shift reactor is above a second predetermined temperature that is higher than the first predetermined temperature; and supplying the heat exchange flow line with cooling water when the temperature inside the CO shift reactor is above a third predetermined temperature that is higher than the second predetermined temperature.

According to an aspect of the present invention, there is provided a fuel cell system comprising a fuel cell stack and the fuel processor.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
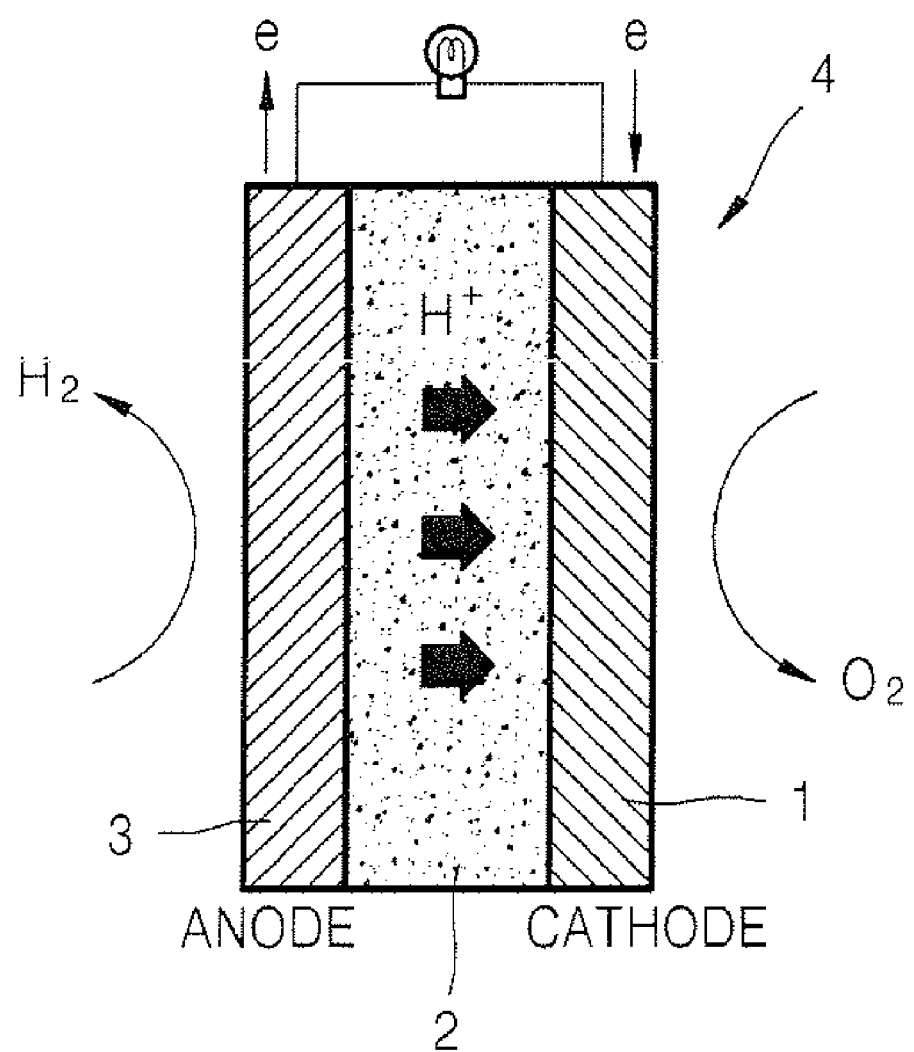
FIG. 1 is a schematic drawing illustrating the principle of electricity generation of a conventional fuel cell.
Figure 2:
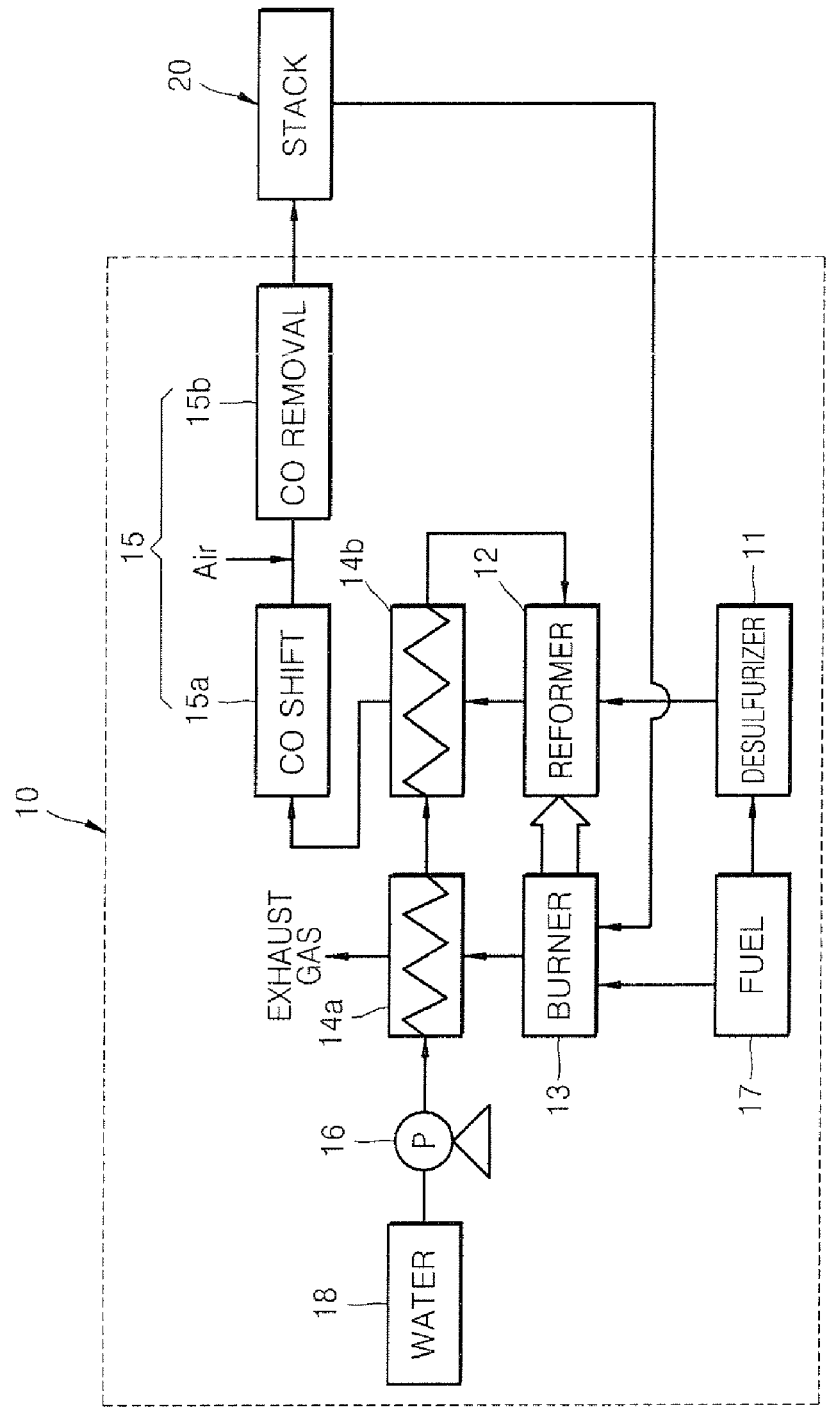
FIG. 2 is a block diagram of a conventional fuel processor that processes a fuel to be supplied to a fuel cell.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
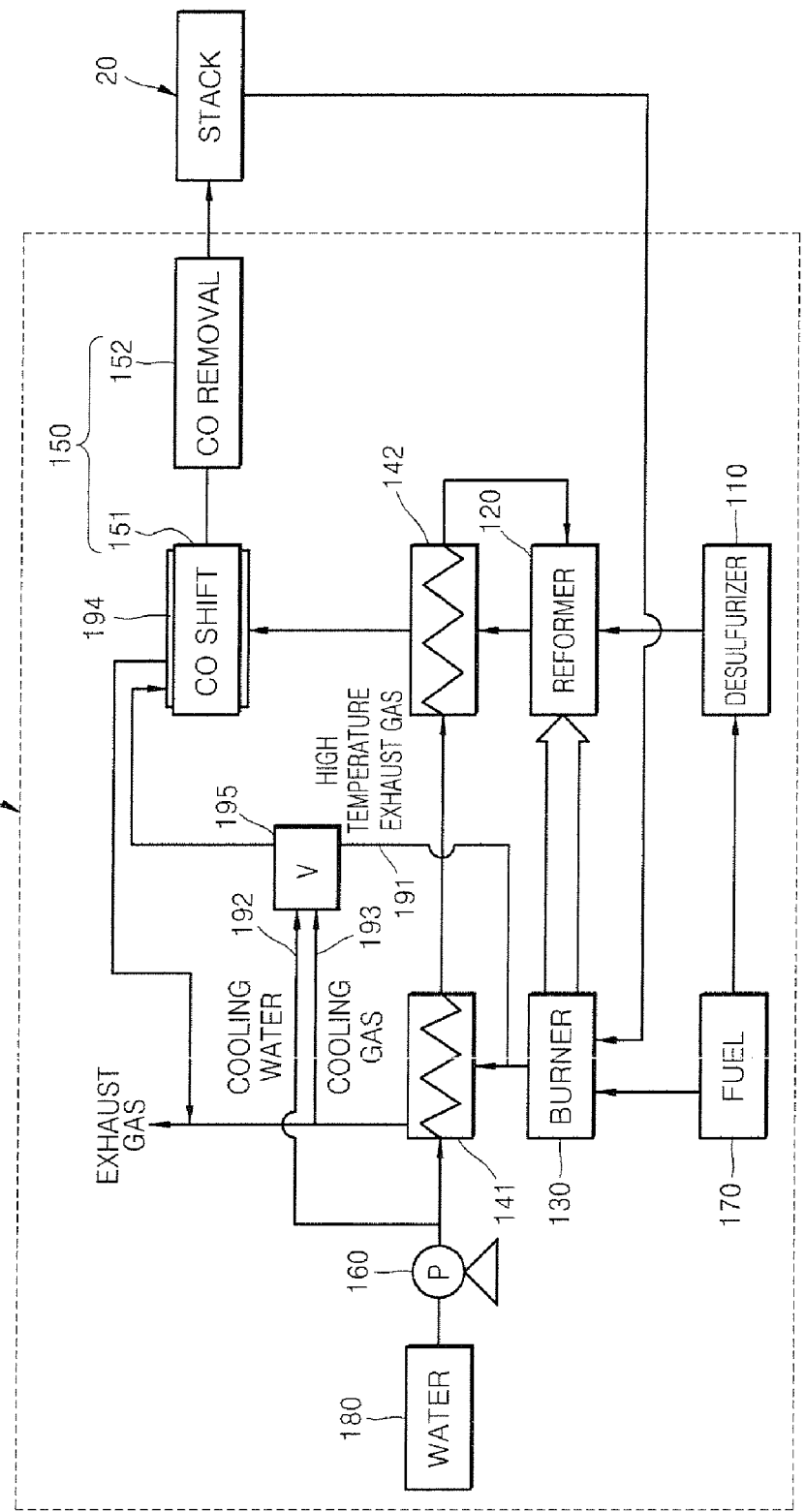
FIG. 3 is a block diagram of a fuel processor according to an embodiment of the present invention.
Figure 4:
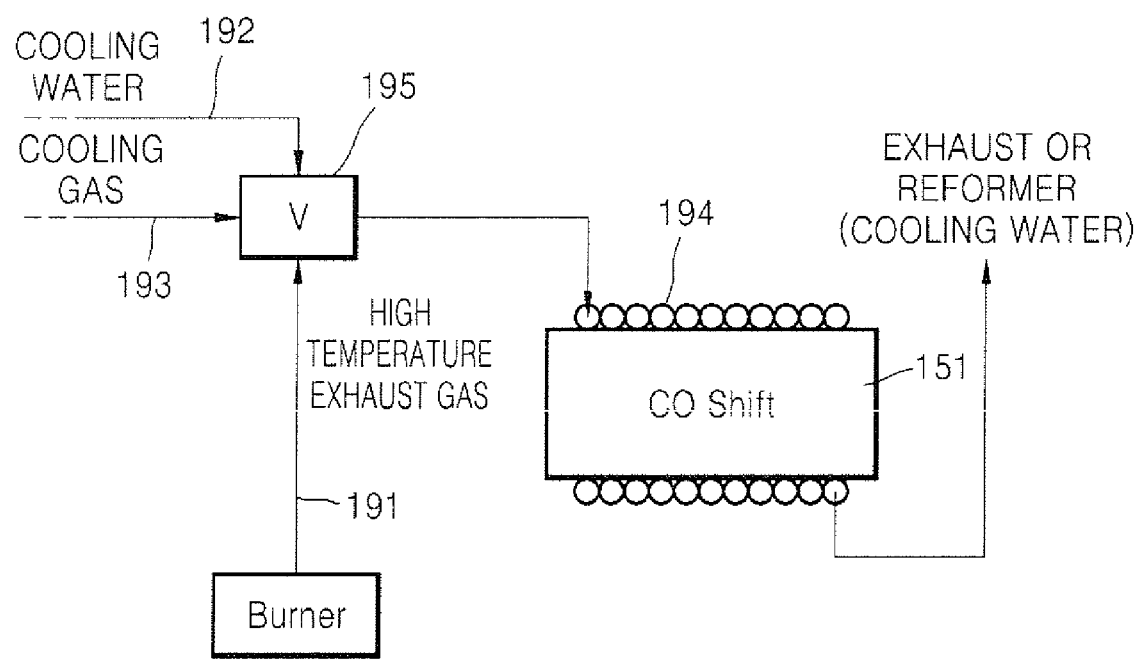
FIG. 4 is a schematic drawing for explaining a heat exchange process in the CO shift reactor of the fuel processor of FIG. 3.

FIG. 3 is a block diagram of a fuel processor 100 according to an embodiment of the present invention. FIG. 4 is a schematic drawing for explaining a heat exchange process in the CO shift reactor of the fuel processor of FIG. 3. The fuel processor 100 includes a desulfurizer 110, a reformer 120, a burner 130, and a CO removal unit 150 consisting of a CO shift reactor 151 and a CO remover 152. The fuel processor 100 has a basic structure in which, when a raw gas such as a natural gas is supplied from a fuel tank 170, sulfur components included in the raw gas are removed by adsorption in the desulfurizer 110, and hydrogen that is to be supplied to a stack 20 is produced in the reformer 120 by reacting the raw gas with steam supplied from a water tank 180 by a pump 160. CO produced in the above process is reduced to an amount of 5000 ppm or less while passing through the CO shift reactor 151, and is further reduced to an amount of 10 ppm or less after passing through the CO remover 152. Reference numerals 141 and 142 respectively indicate first and second heat exchangers for preheating water to be supplied to the reformer 120.

However, although the basic configuration of elements is the same as in the prior art, the fuel processor 100 additionally includes a structure that can actively control heating and cooling of the CO shift reactor 151.

Referring to FIGS. 3 and 4, first, as a heating element, the fuel processor 100 includes an exhaust gas flow line 191 that guides exhaust gases generated in the burner 130 to the CO shift reactor 151 to increase the temperature in the CO shift reactor 151 through heat exchange. The exhaust gas flow line 191 is a by-pass line separated from an exhaust gas line of the burner 130 such that a first portion of the burner exhaust gas is provided to the heat exchanger 141 and a second portion of the burner exhaust gas is directed through the exhaust gas flow line 191. The exhaust gas flow line 191 is selectively connected to a heat exchange flow line 194 provided on an outer wall of the CO shift reactor 151 by a valve 195 to supply a second portion of the high temperature exhaust gas to the heat exchange flow line 194. Accordingly, for example, when a rapid increase in the temperature of the CO shift reactor 151 is necessary for a start-up operation, the supply of the high temperature exhaust gas to the CO shift reactor 151 through the exhaust gas flow line 191 can increase the temperature of the CO shift reactor 151 to a desired level in a short period of time. According to experiments, when the high temperature exhaust gas is supplied to the CO shift reactor 151, the temperature of the CO shift reactor 151 can further be increased by approximately 100° C. That is, the temperature of the CO shift reactor 151 can further be increased by 100° C. whenever necessary.

The fuel processor 100 includes, as cooling elements, a cooling gas flow line 193 that conveys exhaust gases cooled below 100° C. obtained by exchanging heat of a first portion of the exhaust gases from the burner 130 with water in a heat exchanger 141 to the CO shift reactor 151, and a cooling water flow line 192 for supplying water from a water tank 180 to the CO shift reactor 151. The cooling water flow line 192 and the cooling gas flow line 193 are selectively connected to the heat exchange flow line 194 of the CO shift reactor 151 by the control of the valve 195. If relatively slow cooling of the CO shift reactor 151 is required, the cooling gas flow line 193 is connected to the heat exchange flow line 194, and if rapid cooling is required, the cooling water flow line 192 is connected to the heat exchange flow line 194. Of course, the valve 195 can be controlled by a controller (not shown). Accordingly, if the temperature inside the CO shift reactor 151 excessively increases, the temperature of the CO shift reactor 151 can be reduced rapidly by connecting the cooling water flow line 192 or the cooling gas flow line 193 to the heat exchange flow line 194. According to experiments, when the temperature inside the CO shift reactor 151 is 320° C., the CO content in a gas that has passed through the CO shift reactor 151 is approximately 5,000 ppm, and when the temperature inside the CO shift reactor 151 is 270° C., the CO content in a gas that has passed through the CO shift reactor 151 is reduced to approximately 3,000 ppm. In these two cases, the CO content falls within the target level of 5,000 ppm or less, however, it is known that the CO content in the exhaust gas can be minimized when the temperature of the CO shift reactor 151 is in a range between 200 to 300° C. Therefore, when the CO shift reactor 151 is operated in the above temperature range, fuel of good quality can be supplied to a fuel cell.

An operation of the fuel processor 100 having the above configuration will now be described.

First, when the fuel processor 100 starts operating or when a rapid increase in the temperature of a CO shift reactor 151 is required, an exhaust gas flow line 191 is connected to a heat exchange flow line 194 of the CO shift reactor 151 so that high temperature gases can heat the CO shift reactor 151. When the temperature inside the CO shift reactor 151 reaches 200° C., which is an appropriate temperature, due to rapid heating by the high temperature gases, the exhaust gas flow line 191 is disconnected from the heat exchange flow line 194 and the operation of the fuel processor 100 is shifted to a normal operation mode. In this state, the CO shift reactor 151 is continuously heated by hydrogen gas produced in the reformer 120, and thus, the temperature of the CO shift reactor 151 does not fall below 200° C. At this point, water and a fuel source are supplied to the reformer 120 to generate hydrogen gas. The produced hydrogen gas is conveyed to the CO shift reactor 151 and the CO remover 152 through the fuel line. The hydrogen gas in which CO is sufficiently removed is supplied to a stack 20, and thus, a normal operation of the fuel cell is performed.

If the temperature of the CO shift reactor 151 exceeds 300° C. due to a heavy load on the fuel cell, CO cannot be properly removed. At this point, a cooling operation is performed by connecting the heat exchange flow line 194 to the cooling water flow line 192 or the high temperature exhaust gas so that the CO shift reactor 151 can be cooled by cooling gas or cooling water. If the temperature inside the CO shift reactor 151 is between 300 to 350° C., the heat exchange flow line 194 is connected to the cooling gas flow line 193 to cool the CO shift reactor 151 relatively slowly, and if the temperature of the CO shift reactor 151 exceeds 350° C., the heat exchange flow line 194 is connected to the cooling water flow line 192 to cool the CO shift reactor 151 rapidly. In this way, an excessive emission of CO from the CO shift reactor 151 due to overheating of the CO shift reactor 151 can be prevented, thereby making it possible to maintain a stable CO removal performance.

Accordingly, a fuel processor that actively controls the temperature of the CO shift reactor 151 and maintains a stable CO removal performance can be realized.

As described above, the fuel processor according to aspects of the present invention has the following advantages.

First, when it is desired that the temperature inside the CO shift reactor 151 should increase rapidly in a start-up operation, for example, the CO shift reactor 151 can be rapidly heated using high temperature exhaust gases. Therefore, the time required for a fuel processor to reach a normal operation state can be greatly reduced.

Second, if the CO shift reactor becomes overheated, the CO shift reactor can be rapidly cooled, thereby making it possible to maintain a stable CO removal performance.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A fuel processor comprising:
a reformer that generates hydrogen gas by reacting a fuel source and water;
a burner that heats the reformer to a temperature suitable for a hydrogen generation reaction and that exhausts a burner exhaust gas;
a branched burner exhaust line in flow communication with the burner for separating the burner exhaust gas into a first portion and a second portion;
a CO shift reactor that removes CO generated during the hydrogen generation reaction in the reformer;
a heat exchanger;
a heating element to heat the CO shift reactor;
a cooling element to cool the CO shift reactor;
and a valve located downstream of the burner and upstream of the CO shift reactor, the valve being configured to receive heating gas from a first line coupled to the burner exhaust line and to receive cooling gas from a second line that is separate from the first line, and also configured to selectively direct the heating gas from the heating element, and cooling water and the cooling gas from the cooling element, into a common line in accordance with a detected temperature,
wherein the cooling element comprises a cooling water flow line that carries the cooling water and a cooling gas flow line that carries the cooling gas,
wherein the cooling gas is the first portion of the burner exhaust gas that has been subjected to heat exchange with the cooling water and is directly communicated to the heat exchanger, and wherein the cooling water and the cooling gas are selectively supplied through the common line wound around an outer wall of the CO shift reactor and carry out a heat exchange with the CO shift reactor through the common line and the outer wall,
wherein the heating element comprises an exhaust gas flow line that carries out a heat exchange with the CO shift reactor after the second portion of the burner exhaust gas is directly communicated to the CO shift reactor via the valve flows through the exhaust gas flow line,
wherein the exhaust gas flow line bypasses the heat exchanger,
and wherein the valve selectively supplies the second portion of the burner exhaust gas to the CO shift reactor.

2. A fuel cell system comprising a fuel cell stack and the fuel processor of claim 1.

3. A fuel processor comprising:
a reformer that is supplied with a fuel source and reaction water that react to generate hydrogen gas;
a burner that provides heat to the reformer and that produces a burner exhaust gas;
a branched burner exhaust line for separating the burner exhaust gas into a first portion and a second portion;
a CO shift reactor that removes CO from the generated hydrogen gas;
a heat exchange flow line wound around an outer wall of the CO shift reactor that is selectively supplied with cooling water or cooling gas to cool the CO shift reactor or with a heating gas to heat the CO shift reactor;
a valve located downstream of the burner and upstream of the CO shift reactor, and configured to receive the heating gas from a first line coupled to the burner exhaust line and to receive the cooling gas from a second line that is separate from the first line, and also configured to selectively direct the cooling water, the heating gas, and the cooling gas into the heat exchange flow line in accordance with a detected temperature; and
a heat exchanger for cooling the first portion of the burner exhaust gas, which is directly communicated to the heat exchanger from the burner,
wherein the heating gas comprises the second portion of the burner exhaust gas,
and wherein the heating gas is directly communicated to the CO shift reactor via the valve and bypasses the heat exchanger to be selectively supplied to the CO shift reactor via the valve.

4. The fuel processor of claim 3, wherein the heat exchange flow line selectively supplies heating gas according to the detected temperature, wherein the detected temperature is that of the CO shift reactor.

5. The fuel processor of claim 3, wherein the heat exchanger heats the reaction water supplied to the reformer and cools the first portion of the burner exhaust gas,
and wherein the cooling gas comprises the cooled first portion of the burner exhaust gas and wherein the second portion of the burner exhaust gas is not heat exchanged with the reaction water.

6. A fuel cell system comprising a fuel cell stack and the fuel processor of claim 3.

* * * * *